Jan. 17, 1933.  E. A. HARTY  1,894,821
ALTERNATING CURRENT RECTIFIER
Filed Aug. 8, 1929
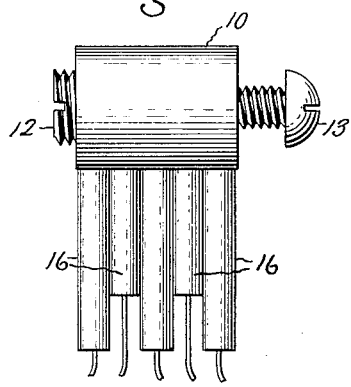
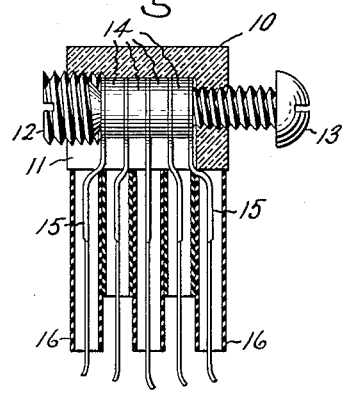
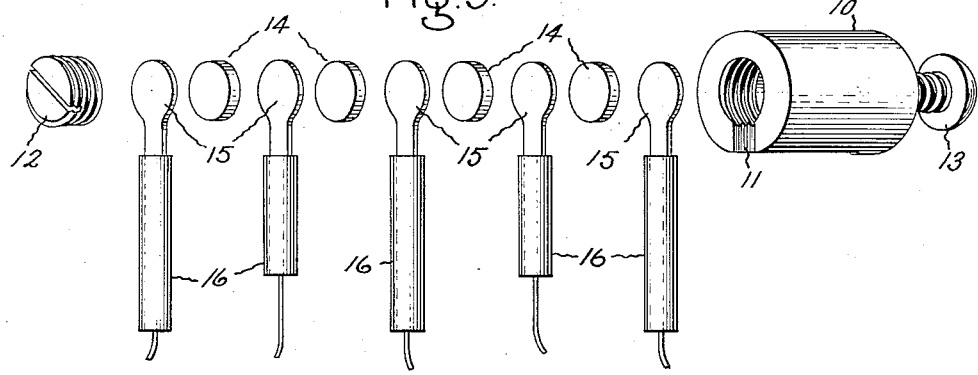
Inventor:
Edgar A. Harty,
by Charles E. Tullar
His Attorney.

Patented Jan. 17, 1933

1,894,821

UNITED STATES PATENT OFFICE

EDGAR A. HARTY, OF LYNN, MASSACHUSETTS, ASSIGNOR TO GENERAL ELECTRIC COMPANY, A CORPORATION OF NEW YORK

ALTERNATING CURRENT RECTIFIER

Application filed August 8, 1929. Serial No. 384,449.

My invention relates to the rectification of alternating current, and has for its principal object the provision of an improved alternating current rectifier which may be used where small amounts of rectified current are required, such as in the circuits of alternating current meters or the like.

Various types of devices for converting alternating current into direct current have been provided in the past. Some of these devices include a pair of solid electrodes which are made of different materials and are mounted in juxtaposition to one another. The useful life of such rectifiers is dependent on the materials entering into the composition of electrodes. Various electrode materials have been used. For example, Polowski Patent 830,924 discloses a rectifier which includes an electrode of aluminum and an electrode of cuprous sulphide, Garetson Patent 929,582 discloses a rectifier including an electrode of silver sulphide and an electrode consisting of a metallic oxide, and Grondahl Patent 1,640,355 discloses a rectifier consisting of copper and copper oxide.

Each of the rectifying devices disclosed by these patents includes solid electrodes, one of which is a relatively good electrical conductor and the other of which is a relatively poor electrical conductor. The relatively good electrical conductor is sometimes designated as the electro-negative electrode and the relatively poor electrical conductor as the electro-positive electrode. In the operation of the device current is readily transmitted from the electro-negative electrode to the electro-positive electrode, but is transmitted with great difficulty in the opposite direction.

My invention relates particularly to a rectifier of the copper oxide type, but may be utilized in connection with other types of rectifiers.

The theory on which the operation of the copper oxide rectifier is based is not well understood, but it is supposed by some authorities that the orbits of the electrons in the electro-negative or copper electrode are relatively large and that the orbits of the electrons in the electro-positive or copper oxide electrode are relatively small, and that, under these conditions, the electrons readily pass from the copper electrode when this electrode is negatively charged, but do not readily pass in the opposite direction when the polarity is reversed. Regardless of whether or not this is the correct theory, it is well known that when an alternating voltage is applied to a circuit including electrodes of copper and copper oxide, an electric current passes readily in one direction and not at all or with great difficulty in the opposite direction.

My invention will be better understood from the following description when considered in connection with the accompanying drawing and its scope will be pointed out in the appended claims.

Referring to the drawing, Fig. 1 is a plan view of a rectifier wherein my invention has been embodied; Fig. 2 is a section view of this rectifier, and Fig. 3 is an exploded view showing the arrangement of the various parts of the device.

As indicated by these figures, the rectifier includes a hollow cylindrical casing 10 of insulating material which is provided with a slot 11 at one of its sides and is threaded at opposite ends to receive the threaded members 12 and 13. Interposed between the threaded members are a plurality of rectifying elements 14 which may be of the copper oxide or any other suitable type. Interposed between these members are a plurality of electrically conductive elements 15 which are provided with terminals extending through the slot 11. These terminals are surrounded by insulation collars 16 which extend into the slot. The conductive members 15 may be made of lead or any other suitable conducting material which insures good electrical contact between the different rectifying elements 14. The threaded or adjustable members 12 and 13 are provided for holding the members 14 and 15 in good contact with one another and may be adjusted to apply any suitable pressure to these members. The insulation collars 16 of course function to prevent contact between the terminals of the conductive members 15.

The illustrated embodiment of the invention was devised particularly for use in connection with alternating current meters but is suitable for use wherever a rectifier of small dimensions and small current capacity is required. As illustrated in the drawing, the device is from three to four times as large as the actual device.

In the use of the device the alternating current circuit may be connected to intermediate terminal member 15 while the direct current meter circuit may be connected between the center terminal member 15 and the two outer terminals 15. Under these conditions both half cycles of the alternating current are rectified, the return circuit from the direct current load being through the center contact terminal 15.

As will be readily understood by those skilled in the art, the illustrated modification of the invention has the advantage that it is easy to assemble, is compact, and avoids the necessity of soldering the leads to the rectifying elements of the device. The device has been found very satisfactory in service and is comparatively inexpensive to manufacture.

What I claim as new and desire to secure by Letters Patent of the United States, is,—

1. An alternating current rectifier including a hollow casing threaded at its ends and slotted at one of its sides, a rectifying element mounted in said casing, a conductive member mounted in juxtaposition to said rectifying element and provided with a terminal extending through said slot, and means for adjusting the pressure between said rectifying element and said conductive terminal member.

2. An alternating current rectifier including an insulation casing provided with a slot at one of its sides and threaded at its opposite ends, a plurality of rectifying elements mounted within said casing, conductive terminal members interposed between said rectifying elements and provided with leads extending through said slot, and means arranged to cooperate with said threaded ends for adjusting the pressure between said rectifying elements and said terminal members.

3. An alternating current rectifier including a hollow casing provided with a slot, a copper oxide rectifying element mounted within said casing, a conductive member mounted in juxtaposition to said element and provided with a lead extending through said slot, and means for adjusting the pressure between said element and said terminal member.

4. An alternating current rectifier including a hollow casing having an elongated opening formed in one side thereof, means including a plurality of rectifying elements mounted in said casing, a plurality of electrically conductive means each in contact with a different one of said elements and extending through said opening, and means electrically independent of said conductive means for adjusting the pressure between said elements.

5. An alternating current rectifier including an insulation casing threaded at its opposite ends and having an opening formed in one side thereof, a plurality of rectifying elements mounted in said casing, a plurality of electrically conductive means each in contact with a different one of said elements and extending through said opening, and means electrically independent of said conductive means and threaded into said ends for adjusting the pressure between said elements.

In witness whereof, I have hereunto set my hand this sixth day of August, 1929.

EDGAR A. HARTY.